May 31, 1960 A. H. BOBECK 2,939,115

PULSE GENERATOR

Filed Dec. 28, 1955 2 Sheets-Sheet 1

INVENTOR
A. H. BOBECK
BY
ATTORNEY

May 31, 1960 A. H. BOBECK 2,939,115

PULSE GENERATOR

Filed Dec. 28, 1955 2 Sheets-Sheet 2

INVENTOR
A. H. BOBECK
BY [signature]
ATTORNEY 2,939,115

PULSE GENERATOR

Andrew H. Bobeck, Chatham, N.J., assignor to Bell Telephone Laboratories, Incorporated, New York, N.Y., a corporation of New York Filed Dec. 28, 1955, Ser. No. 555,976
9 Claims. (Cl. 340—174)

This invention relates to magnetic core circuits and more particularly to magnetic core pulse generating networks.

The use of magnetic cores as information handling and control devices is rapidly increasing in various systems, such as telephone systems, data processing systems, computers and the like. In such systems, magnetic cores have been employed as memory elements, amplifier elements and switching elements, among other applications. As is known in the art, the magnetic cores utilized in these applications generally are of the type which have substantially rectangular hysteresis characteristics and consequently are capable of attaining two unique states of magnetization. Conventionally, a core in one remanent state of magnetization is said to be in the set state and a core in the other remanent state of magnetization is said to be in the unset state.

Prior art magnetic core circuits generally have included at least a set winding, an advance winding and an output winding. Information may be stored in a magnetic core by the application of a pulse to the set winding which results in the generation of a magnetomotive force and causes the core to be switched to the set state. This information may be read out of the core by the application of a pulse to the advance winding which also results in the generation of a magnetomotive force and causes the core to be switched back to the unset state. This change in flux during the switching of the magnetic condition of the core from its set to its unset state causes an output pulse to be generated in the output winding.

Output pulses also may be generated with magnetic core circuits by cross coupling a pair of cores to form a flip-flop wherein the switching of one core from the set to the unset state causes the other core to be switched from the unset to the set state. In circuits of this type a sequence of alternately phased pulses may be provided on a pair of conductors by the continuous triggering of the flip-flop.

In some applications of magnetic core circuits, such as the magnetic core memory system disclosed in a copending application of A. H. Bobeck and J. H. Felker, Serial No. 555,889, filed December 28, 1955, it becomes necessary that a pulse generator provide alternately phased pulses on a selected one of a plurality of pairs of output conductors. For example, in the A. H. Bobeck-J. H. Felker application identified above, a magnetic core matrix is driven by a master sequential access switch and at least one subroutine sequential access switch. Each access switch has a plurality of output conductor pairs which are connected in a predetermined pattern to selected addresses in the matrix. As the access switch is stepped along in response to alternately phased pulses received from a pulse generator, output pulses are applied over the output conductor pairs to the matrix to carry into effect the desired program of operation. Since it is desirable in such a system to shift readily from the master access switch to the subroutine access switch and back at various times during the operating cycle of the system, it is advantageous that the pulse generator be capable of applying an alternately phased pulse output to either one access switch or the other upon command.

It is a general object of this invention to provide an improved magnetic core pulse generator. More specifically, it is an object of this invention to provide a pulse generator comprising a magnetic core logic circuit.

It is a further object of this invention to provide a magnetic core pulse generator having a plurality of alternately phased pulse outputs.

It is a still further object of this invention to provide a magnetic core pulse generator capable of selectively applying alternately phased output pulses to a chosen one of a plurality of utilization devices.

These and other objects are realized in an illustrative embodiment of this invention which comprises a magnetic core logic circuit including a pair of magnetic flip-flops. Each flip-flop consists of two magnetic core blocking oscillators connected back to back, i.e., cross coupled to each other so that when one blocking oscillator core shifts from the set to the unset state, the other shifts from the unset to the set state. Thus the magnetic state of each core in a flip-flop always is opposite the state of the other core.

The pair of flip-flops are cross coupled to each other, each core having a winding connected to a winding of a core of the other flip-flop. In accordance with an aspect of this invention this arrangement defines two pairs of logical AND circuits. Consequently, when the two flip-flops are made to operate in synchronism, an output comprising a series of alternately phased pulses is provided on a first pair of output conductors connected to the pulse generator. Conversely, when the two flip-flops are made to operate out of synchronism, a series of alternately phased pulses is provided over a second pair of output conductors. Thus either the master access switch or the subroutine access switch may be driven by the pulse generator dependant upon whether the two flip-flops are being operated in or out of synchronism.

In accordance with another aspect of this invention, the pulse generator provides an additional output, namely, an output pulse which coincides in time with one of the alternately phased pulses appearing on each of the output conductor pairs.

It is a feature of this invention that a pair of magnetic core flip-flops be cross coupled to each other to define a pair of logical AND circuits.

It is another feature of this invention that a pair of magnetic core flip-flops have triggering means connected thereto for selectively operating the flip-flops in or out of synchronism.

It is a further feature of this invention that a pair of magnetic core flip-flops have two pairs of output conductors connected thereto so that when the flip-flops are operated in synchronism, alternately phased pulses are applied only to one of the pairs of output conductors and when the flip-flops are operated out of synchronism, alternately phased pulses are applied only to the other pair of output conductors.

It is a still further feature of this invention that a further output conductor be connected to the pair of magnetic core flip-flops to which output pulses are applied regardless of the synchronism condition of operation of the two pairs of flip-flops.

A complete understanding of this invention and the above features thereof may be gained from the following description and accompanying drawing, in which.

Figure 1:
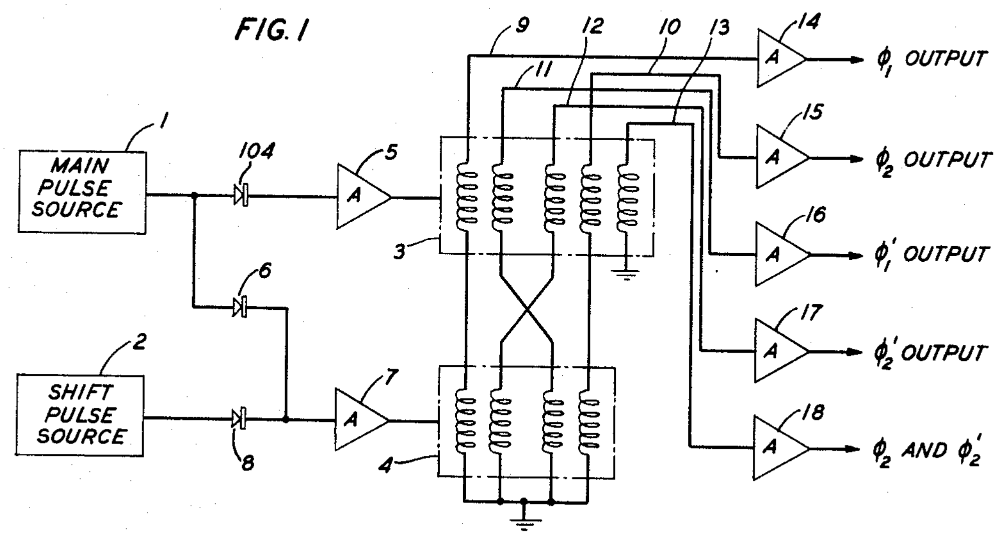
Fig. 1 is a block diagram representation of a magnetic core pulse generator illustrative of an embodiment of this invention.

Referring now to the drawing, the pulse generator depicted in block diagram form in Fig. 1 comprises a main pulse source 1, a shift pulse source 2, and a pair of magnetic core flip-flops 3 and 4, respectively. Main pulse source 1 is connected to flip-flop 3 through a diode 104 and amplifier 5 and to magnetic flip-flop 4 through diode 6 and amplifier 7. Shift pulse source 2 is connected to magnetic core flip-flop 4 through diode 8 and amplifier 7. Each of the magnetic core flip-flops comprises a pair of magnetic cores having a plurality of windings, the windings of the cores in the two flip-flops being interconnected in a prearranged fashion. Output pulses are taken from the magnetic core flip-flops by means of the output leads 9, 10, 11, 12 and 13. In accordance with the invention, when the flip-flops 3 and 4 are being operated in synchronism a series of alternately phased output pulses, $\phi_1$ and $\phi_2$ are applied to the output leads 9 and 10, respectively, and through the amplifiers 14 and 15 to the desired utilization devices. Further, in accordance with the invention, if the magnetic core flip-flops 3 and 4 are being operated out of synchronism, there will be no output on the leads 9 and 10. In this case, a series of alternately phase output pulses $\phi_1'$ and $\phi_2'$ are applied to the output leads 11 and 12 and through the amplifiers 16 and 17 to the appropriate utilization devices. It often is desirable to obtain an output pulse in coincidence with either the $\phi_2$ or $\phi_2'$ pulses and advantageously the invention makes provision for such an output which is applied to lead 13 and through amplifier 18 to the appropriate utilization device.

Magnetic core flip-flop circuits 3 and 4 are triggered by pulses from the main pulse source 1. These pulses are applied simultaneously to each of the two flip-flops when the latter are operated in synchronism, due to the logic of the magnetic cores of the flip-flop circuits, an output will appear only on output leads 9, 10 and 13 and not on leads 11 and 12. If, however, it is desired to apply an output to leads 11 and 12 rather than 9 and 10, a single control pulse from shift pulse source 2 is applied through diode 8 and amplifier 7 only to the flip-flop 4 which serves to make the latter run out of step with flip-flop 3 when driven by pulses from main pulse source 1. The windings on the cores of flip-flops 3 and 4 are interconnected to define four AND circuits and the condition of synchronization of operation of the two flip-flops determines which output leads will have pulses thereon and which will be inhibited. A second control pulse from source 2 will return the two flip-flops to synchronous operation and restore the outputs to leads 9 and 10.

The operation of a single flip-flop of a type which advantageously may be employed in the circuit of Fig. 1 may be explained with reference to Fig. 2. This circuit comprises a magnetic flip-flop consisting of two blocking oscillators connected back to back. One blocking oscillator is defined by magnetic core 19 which has windings 20, 21, 22 and 23 coupled thereto. A transistor 24 has its base electrode 25 coupled to one end of winding 20 and its collector electrode 26 connected to one end of winding 21. The emitter electrode 27 of transistor 24 is connected to ground. The other end of winding 20 is connected to a source of potential 28.

The other blocking oscillator is defined by magnetic core 29 which has coupled thereto windings 30, 31, 32 and 33. A transistor 34 has its base electrode 35 connected to one end of winding 33 and its collector electrode 36 connected to one end of winding 32. Emitter electrode 37 of transistor 34 is connected to ground. The other end of winding 33 is connected to potential source 28.

The other end of winding 21 of magnetic core 19 is connected to one end of winding 31 of magnetic core 29. One end of winding 22 of magnetic core 19 is connected to the other end of winding 32 of magnetic core 29. Thus the two cores have a pair of windings cross coupling the cores in a symmetric fashion. The other end of winding 22 of magnetic core 19 is connected through a resistance 38 to a source of potential 39 and the other end of winding 31 of magnetic core 29 is connected through a resistance 40 to a potential source 39. Winding 23 of magnetic core 19 and winding 30 of magnetic core 29 are serially connected between a pulse source 41 and a source of direct current potential 42.

Figure 2:
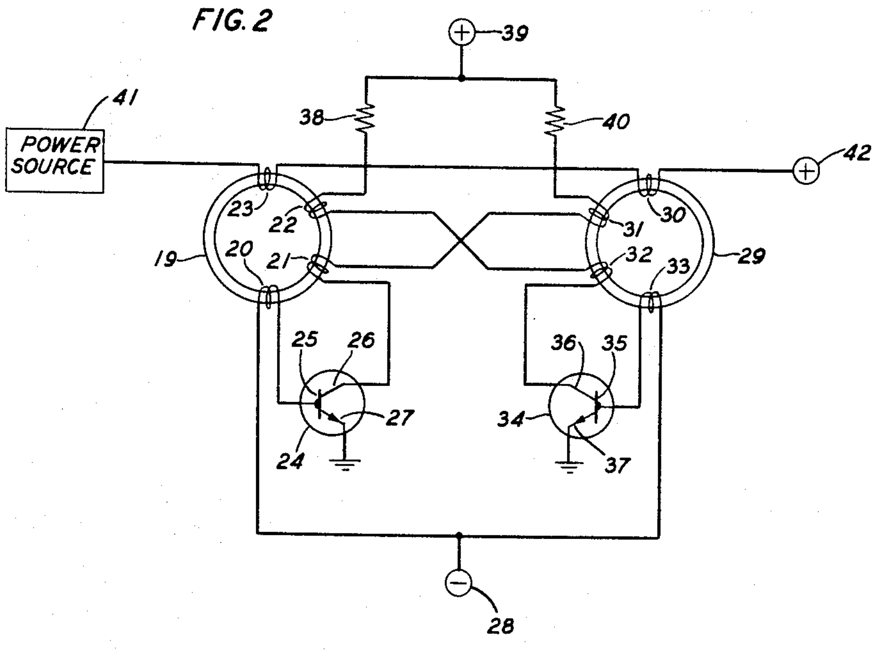
Fig. 2 is a schematic representation of a magnetic core flip-flop circuit.

In the operation of each magnetic core of the flip-flop circuit shown in Fig. 2 the pair of windings connected to the associated transistor are so connected and wound on the core that they regeneratively couple the base and collector electrodes of the transistor. For example, windings 20 and 21 of magnetic core 19 regeneratively couple the base and collector electrodes 25 and 26, respectively, of transistor 24. Likewise, windings 32 and 33 of magnetic core 29 are so connected and wound that they regeneratively couple the base and collector electrodes 35 and 36, respectively, of transistor 34. Initially, one core of the flip-flop will be in one magnetic state which we shall call P, and the other core will be in the other magnetic state which we shall call N. A short duration trigger pulse from the pulse source 41 applied to the windings 23 and 30, respectively, tends to drive both cores in the flip-flop toward the N magnetic state. However, only the core initially in the P state causes regeneration in its associated blocking oscillator. The resulting collector current then tends to drive the other core from N to P. The next trigger pulse from pulse source 41 results in the second core being driven from P to N which, in turn, drives the first core from N to P. As the cores change their magnetic state an output pulse may be taken from each core so that the continuous alternating condition of the flip-flop produces alternate $\phi_1$, $\phi_2$ pulses which may be applied to the appropriate utilization devices.

It will be appreciated that a magnetic core flip-flop of this type has the advantage of requiring no standby of power since both transistors normally are cut off. An additional advantage is that pulses of a predetermined length are obtained directly, which property makes the combination of flip-flops of this type for logic purposes quite simple.

Figure 3:
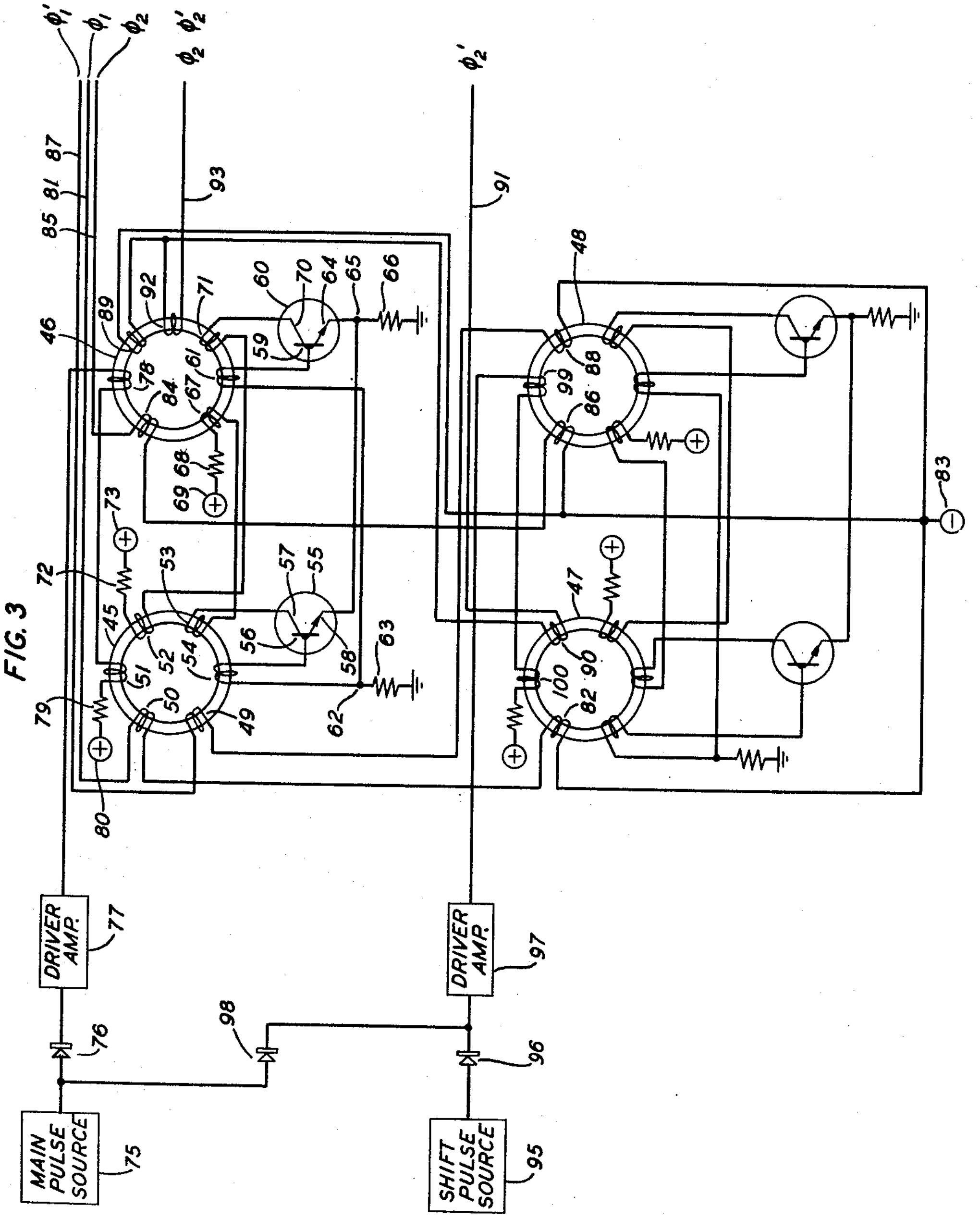
Fig. 3 is a schematic representation of a pulse generator including a magnetic core logic circuit in accordance with the embodiment of Fig. 1.

The details of the pulse generator of the invention in which four AND circuits are obtained by adding additional windings on the flip-flop cores are shown in Fig. 3. The heart of a pulse generator shown in Fig. 3 is the pair of magnetic core flip-flop circuits defined by magnetic cores 45 and 46, and 47 and 48, respectively. Each core in the flip-flops has a plurality of windings in the manner of windings 49, 50, 51, 52, 53 and 54 of magnetic core 45. Each core also has a transistor associated therewith as, for example, transistor 55, which includes a base electrode 56, a collector electrode 57 and an emitter electrode 58. Base electrode 56 of transistor 55 is connected to one end of winding 54. Similarly, base electrode 59 of transistor 60 associated with magnetic core 46 is connected to one end of winding 61. The other end of windings 54 and 61, respectively, are connected to a common junction 62 and therefrom through resistance 63 to ground. Emitter electrodes 58 and 64 of transistor 55 and 60, respectively, are connected to a common junction 65, and therefrom through a resistance 66 to ground. Collector electrode 57 of transistor 55 is connected to one end of winding 53 of magnetic core 45. The other end of winding 53 is connected through a winding 67 of core 46 and resistance 68 to a source of direct current potential 69. Collector electrode 70 of transistor 60 is connected to one end of winding 71 of core 46. The other end of winding 71 is connected through winding 52 of core 45 and resistance 72 to a source of direct current potential 73.

Signal pulses are applied from main pulse source 75 through diode 76 and driver amplifier 77 to series connected windings 78 and 51 of magnetic cores 46 and 45, respectively, and through a resistance 79 to a source of direct current potential 80. Simultaneously, signal pulses are applied from pulse source 75 through diode 98 and driver amplifier 97 to series connected windings 99 and 100 of magnetic cores 48 and 47, respectively. One end of winding 50 of core 45 is connected to conductor 81 and thereby may apply output $\phi_1$ pulses to any desired utilization circuit. The other end of winding 50 of magnetic core 45 is connected through a winding 82 of magnetic core 47 to a source of direct current potential 83. Similarly, one end of winding 84 of magnetic core 46 is connected by conductor 85 to apply $\phi_2$ output pulses to any desired utilization device while the other end thereof is connected through a winding 86 of magnetic core 48 to the source of direct current potential 83. One end of winding 49 of magnetic core 45 is connected by conductor 87 to the $\phi_1'$ pulse output circuit and the other end of winding 49 is connected through winding 88 of the magnetic core 48 to direct current potential source 83. One end of winding 89 of magnetic core 46 is connected to direct current potential source 83, while the other end thereof is connected through winding 90 of magnetic core 47 and conductor 91 to the $\phi_2'$ output circuit. Magnetic core 46 also includes a winding 92 which has one end thereof connected through winding 90 to the $\phi_2'$ output circuit and the other end thereof connected by conductor 93 to the $\phi_2,\phi_2'$ output circuit.

Thus, it can be seen that the two pairs of magnetic core flip-flop circuits basically are similar in construction and have output windings connected to comprise four logic AND circuits. One AND circuit comprises winding 82 of magnetic core 47 and winding 50 of magnetic core 45. A second AND circuit comprises winding 88 of magnetic core 48 and winding 49 of magnetic core 45. A third AND circuit comprises winding 86 of magnetic core 48 and a winding 84 of magnetic core 46. A fourth AND circuit comprises winding 90 of magnetic core 47 and winding 89 of magnetic core 46.

Thus magnetic core 47 has a separate winding connected in series with a winding of each of cores 45 and 46 and in a similar manner magnetic core 48 has a separate winding connected in series with a winding of each of cores 45 and 46 thereby providing four pairs of combinations of core windings. In the operation of the flip-flop circuits their magnetic states are determined by driving pulses which are applied to the flip-flops from the main pulse source 75 and the shift pulse source 95, respectively. These four AND circuits provide alternate $\phi_1$ and $\phi_2$ pulses over either of the conductor pairs 81 and 85 or 87 and 91 in accordance with the synchronous states of the flip-flops, that is, whether the flip-flops are operating in synchronism or out of synchronism.

The magnetic logic of the additional windings on the flip-flop cores, that is, the winding connecting a core of one flip-flop with a core of another flip-flop is such that the output from one pair of cores is inhibited as the flip-flops are being driven in synchronism. On the other hand, the output from the other pair of cores will be inhibited if the flip-flops are being driven out of synchronism. The shift from one type of operation to the other occurs, in accordance with this invention, when a control pulse is applied to the flip-flop comprising magnetic cores 47 and 48 from the shift pulse source 95 through diode 96 and driver amplifier 97 in this specific embodiment.

Additionally an output pulse will appear on lead 93 to the $\phi_2,\phi_2'$ output circuit, which may be considered thus as a clock circuit, during the second phase of operation of the circuit regardless of whether the flip-flops are driven in synchronism or not. Accordingly, while a pulse will appear only on either lead 85 or lead 91, a pulse will appear on lead 93 simultaneously with pulses on either lead 85 or 91.

Each of the flip-flops of the pulse generator represented in Fig. 3 as including the pairs of cores 45 and 46, and 47 and 48, respectively, is operated in the manner described in detail hereinbefore in connection with the circuit shown in Fig. 2. The synchronous and non-synchronous modes of operation of the arrangement according to Fig. 3 will now be more particularly described. In the synchronous mode, corresponding cores of the pulse generator pairs are simultaneously set and reset. Thus, assuming cores 45 and 47 to be in a set or P magnetic condition, a current pulse applied from the source 75 to the two pairs of cores via the diodes 76 and 98 will cause these cores to be reset. The cores 46 and 48 will then be set or driven to a P condition as a result of the regenerative action of the flip-flops. As a result of the resetting of the cores 45 and 47 an output voltage will be induced in each of the output windings 50 and 82 of these cores, respectively. Since the latter windings are wound in the same sense these voltages will be additive and will appear on the conductor 81 as a $\varphi_1$ output signal. Obviously, when the cores 46 and 48 are set, a negative additive output signal will appear on the conductor 85 due to the additive voltages induced in the respective output windings 84 and 86. This latter signal may of course also be utilized either instead of or together with the $\varphi_1$ positive signal.

Upon the next application of a pulse from the source 75 the now set cores 46 and 48 will be reset and, in accordance with the manner of operation described for the resetting of cores 45 and 47, a positive output signal $\varphi_2$ will appear on the conductor 85 due to the addition of the induced voltages across the serially connected output windings 84 and 86. At this time a negative additive voltage will also be induced across the windings 50 and 82 by the simultaneous setting of the cores 45 and 47, respectively, and will appear as an available negative output signal on the conductor 81.

During the operation described above voltages will also be induced across the output winding pairs 49 and 88, and 89 and 90 of the alternate cores 45 and 48, and 46 and 47, respectively. These voltages will, however, be cancelled, thereby presenting an effectively zero signal on the conductors 87 and 91. Thus, while the core 45 is reset during synchronous operation, the core 48 will be set and, since the serial windings 49 and 88 of these cores are in the same sense, the additive induced voltages will be of opposite polarity and will therefore cancel. Similarly, with respect to the setting and resetting of the cores 46 and 47, the additive voltages induced in the serial windings 89 and 90, respectively, will be of opposite polarity and will accordingly also be cancelled.

In the non-synchronous mode of operation alternate cores of the pulse generator pairs are simultaneously set and reset. To achieve an initial set or P magnetic condition in a core of the first flip-flop and a reset or N magnetic condition in the corresponding core of the other flip-flop, a current pulse is applied from the source 95 only to the cores 47 and 48 following a current pulse from the source 75. The diode 98 prevents the application of the former pulse also to the cores 45 and 46. Thus, assuming the cores 45 and 47 to be initially in a P magnetic condition, the application of the current pulse from the source 95 to the core 47 will reset the latter core and as a result core 48 will be driven to a set or P condition. Upon the next application of a pulse from the source 75 to both flip-flops, cores 45 and 48 will be reset and cores 46 and 47 will be set in the manner described above for the synchronous mode of operation. As a result additive induced voltages across the serial windings 49 and 88 will appear as a positive output signal $\varphi_1'$ on the conductor 87. An available negative additive voltage will also appear on the conductor $\varphi_2'$ because of the setting of the cores 46 and 47 and resulting voltages induced in the respective windings 89 and 90. The voltages induced across the windings 50 and 82 by the resetting and setting of the cores 45 and 47, respectively, will cancel as will the voltages induced across the windings 84 and 86 by the setting and resetting, respectively, of the cores 46 and 48. A positive output signal $\varphi_2'$ will appear on the conductor 91 when the cores 46 and 47 are reset by the nevt application of a current pulse from the source 75 in a manner identical to that described for the production of a $\varphi_1'$ output signal.

Since the winding 92 of the core 46 is serially connected to the winding 89 of the same core an output signal will appear on the conductor 93 whenever the core 46 switches from a P to an N condition whether or not the corresponding core 48 of the second flip-flop simultaneously so switches. A $\varphi_2$, $\varphi_2'$ output signal is thus obtained for either synchronous or non-synchronous operation.

In this manner and in accordance with aspects of this invention two phase pulses may be applied to either of two sets of leads, as well as a second phase pulse always appearing on a separate lead, dependent on the occurrence of a single control or shift pulse. The output pulses will continue to appear on the designated pair of output leads until, as may be desired, the next shift pulse occurs.

It is to be understood that the above-described arrangements are illustrative of the application of the principles of the invention. Numerous other arrangements may be devised by those skilled in the art without departing from the spirit and scope of the invention.

What is claimed is:

1. A pulse generating network comprising a first flip-flop, a second flip-flop, each flip-flop including a pair of bistable magnetic cores having a plurality of windings inductively coupled thereto, a pair of transistors, first circuit means including certain of said windings for regeneratively connecting each transistor to one of said magnetic cores to form a blocking oscillator, and second circuit means interconnecting another winding of the core of each blocking oscillator to said first circuit means of the other blocking oscillator such that one core shifts from a first stable state to a second stable state when the other core shifts from said second stable state to said first stable state, means including a first pulse source connected to each of the flip-flops for triggering said flip-flops, means including a second pulse source connected to only said second flip-flop to control the synchronization of operation of said flip-flops, a first output means coupled to said flip-flops for receiving a series of alternately phased output pulses only when said flip-flops are operated in synchronism and a second output means coupled to said flip-flops for receiving a series of alternately phased output pulses only when said flip-flops are operated out of synchronism.

2. A pulse generating network comprising a first flip-flop, a seond flip-flop connected to said first flip-flop, a first pulse source connected to both flip-flops for applying simultaneous triggering pulses to each flip-flop, a second pulse source connected only to said second flip-flop for applying control pulses only to said second flip-flop to control the synchronization of operation between said flip-flops, a first pair of output conductors connected to corresponding stages of said flip-flops so as to have two phase output pulses applied thereto only when said flip-flops are operated in synchronism, and a second pair of output conductors connected to opposite stages of said flip-flops so as to have two phase output pulses applied thereto only when said flip-flops are operated out of synchronism.

3. A pulse generating network in accordance with claim 2 wherein each of said flip-flops comprises a pair of magnetic cores of the type having square loop characteristics and capable of attaining either of two stable states, transistor means connected to each of said cores, and means interconnecting said cores whereby when one core is caused to shift from one stable state to the other stable state when the other core shifts from said other stable state to said one stable state.

4. A pulse generating network in accordance with claim 3 further comprising output means connected to said flip-flops to which output pulses are applied regardless of the synchronous state of operation of said flip-flops.

5. A circuit for selectively providing alternatively phased output pulses on either of two pairs of output conductors comprising a first pair of magnetic cores, a second pair of magnetic cores, each of said cores having a substantially rectangular hysteresis characteristic and the cores of each pair comprising a flip-flop, means connecting each core of said first pair with each core of said second pair to define a plurality of logical AND circuits, pulse means connected to each pair of cores to cause the flip-flops to operate in synchronism and out of synchronism, means connected to one pair of cores to determine the synchronization of operation of said flip-flops, and first and second output conductor pairs responsive to said AND circuits whereby the synchronous operation of said flip-flops causes output pulses to be applied only to said first output conductor pair and the nonsynchronous operation of said flip-flops causes output pulses to be applied only to said second output conductor pairs.

6. A magnetic core circuit adapted to apply output signals on selected ones of a plurality of output conductors comprising a plurality of magnetic cores of the type having substantially rectangular hysteresis characteristics, means connecting pairs of said magnetic cores to form flip-flop circuits, means connecting the magnetic cores of one flip-flop circuit to the magnetic cores of another flip-flop circuit, pulsing means connected to all said flip-flop circuits to operate said circuits, pulsing means connected to said one flip-flop circuit to determine the synchronism of operation of said one flip-flop circuit with said other flip-flop circuit, output means connected to said flip-flop circuits having output pulses applied thereto only if said circuits are operated in synchronism, and further output means connected to said flip-flop circuits having output pulses applied thereto only if said circuits are operated out of synchronism.

7. A magnetic core circuit adapted to apply output signals on selected ones of a plurality of output conductors comprising a first pair of magnetic cores each having a plurality of output windings thereon, means connecting certain of said output windings of each core of said first pair to form a magnetic flip-flop circuit, a second pair of magnetic cores each having a plurality of output windings thereon, means connecting certain of said output windings of each core of said second pair to form a magnetic flip-flop circuit, each of said cores being capable of assuming one or another condition of magnetic remanence, pulsing means connected to both said flip-flop circuits to drive said circuits, control pulse means connected to only one of said circuits to determine the synchronism of said driven circuits with respect to each other, and means connecting output windings on each of said first pair of cores to output windings on each of said second pair of cores.

8. A magnetic core circuit comprising a first pair of output terminals, a second pair of output terminals, a first pair of magnetic cores each having a plurality of output windings thereon, means connecting certain of the output windings of each of said first pair of cores to form a magnetic flip-flop circuit, a second pair of magnetic cores each having a plurality of output windings thereon, means connecting certain of the output windings of each of said second pair of cores to form a magnetic flip-flop circuit, each of said cores being capable of assuming a first and a second condition of magnetic remanence, a first output winding on each of said first pair of cores being connected to distinct output windings on one of said second pair of cores and a second output winding on each of said first pair of cores being connected to distinct output windings on the other of said second pair of cores, means connecting said first and second output windings to said pairs of terminals, pulsing means connected to both said flip-flop circuits to drive said circuits, and control pulse means connected to only one of said circuits to control the synchronism of said driven circuits with respect to each other, output pulses appearing at one of said first and second pairs of output terminals dependent on the synchronism of said circuits.

9. A magnetic core circuit comprising a first pair of output terminals, a second pair of output terminals, a first pair of magnetic cores each having a substantially rectangular hysteresis characteristic and having a plurality of output windings thereon, means connecting certain of said output windings of each of said first pair of cores to form a magnetic flip-flop circuit, a second pair of magnetic cores each having a substantially rectangular hysteresis characteristic and having a plurality of output windings thereon, means connecting certain of the output windings of each of said second pair of cores to form a magnetic flip-flop circuit, means connecting a first output winding on one of said first pair of cores and a first output winding on one of said second pair of cores in series to one of said first pair of terminals, means connecting a first output winding on the other of said first pair of ores and a first output winding on the other of said second pair of cores in series to the other of said first pair of terminals, means connecting a second output winding on said one first pair of cores and a second output winding on said other second pair of cores in series to one of said second pair of terminals, means connecting a second output winding on said other first pair of cores and a second output winding on said one second pair of cores in series to the other of said second pair of terminals, pulsing means connected to both said flip-flop circuits to drive said circuits, and control pulse means connected to only one of said circuits to determine the synchronism of said driven circuits with respect to each other, output pulses appearing at said pairs of output terminals dependent on the synchronism of said circuits.

References Cited in the file of this patent

UNITED STATES PATENTS

| | | |
|---|---|---|
| 2,591,406 | Carter | Apr. 1, 1952 |
| 2,682,615 | Sziklai et al. | June 29, 1954 |
| 2,692,379 | Toth | Oct. 19, 1954 |
| 2,709,757 | Triest | May 31, 1955 |
| 2,741,758 | Cray | Apr. 10, 1956 |
| 2,760,085 | Nice | Aug. 21, 1956 |
| 2,760,086 | Nice | Aug. 21, 1956 |
| 2,772,357 | Wang | Nov. 27, 1956 |
| 2,784,391 | Rajchman | Mar. 5, 1957 |